United States Patent Office 3,692,624
Patented Sept. 19, 1972

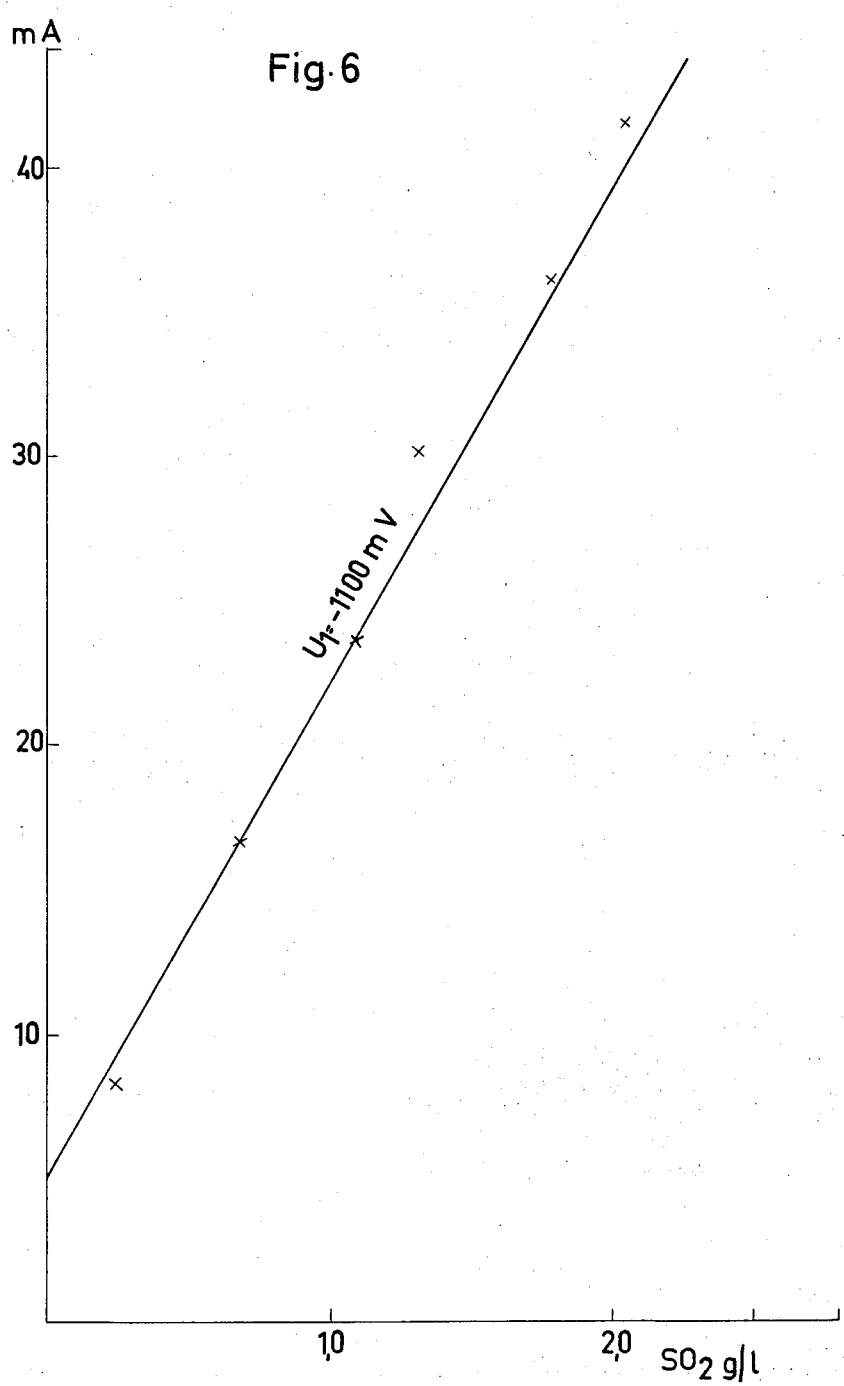

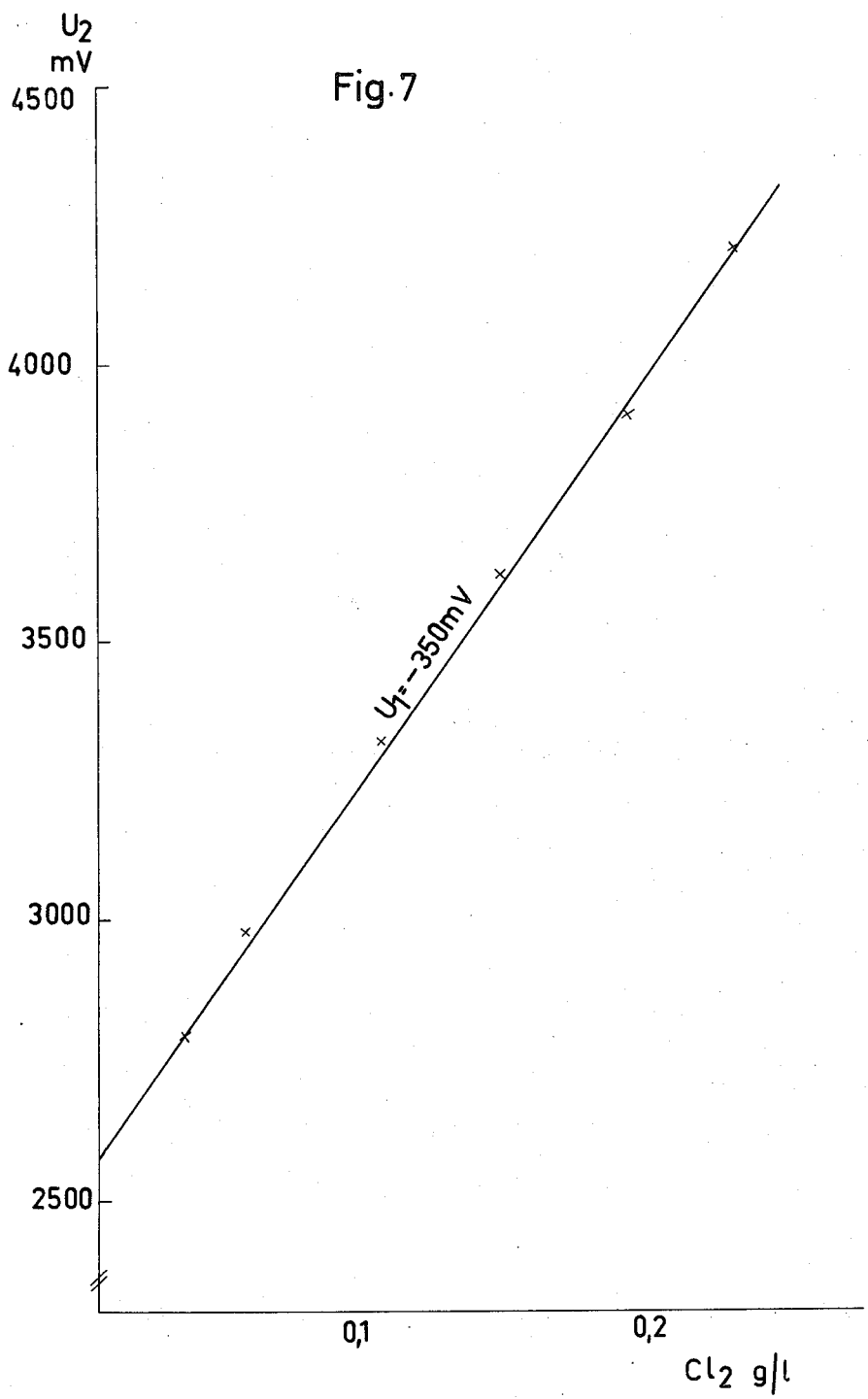

3,692,624
MEASURING AND REGULATION METHOD, FOR WATER SOLUBLE, OXIDIZING OR REDUCING COMPOUND PARTICULARLY IN PULP BLEACHING
Ilmo Yrjala, Rauma, Finland
Filed Feb. 19, 1970, Ser. No. 12,681
Claims priority, application Finland, Feb. 21, 1969, 563/69
Int. Cl. D21c 7/12
U.S. Cl. 162—49
7 Claims

ABSTRACT OF THE DISCLOSURE

A method for continuously measuring and regulating dosage for water soluble oxidizing or reducing compounds of the type having rapid concentration variation by maintaining a constant potential difference between a measuring electrode and a comparison electrode. The current value necessary to maintain said potential difference is measured and used to automatically regulate the dosage in a compound as the compound moves with respect to the electrodes.

---

Figure 1:
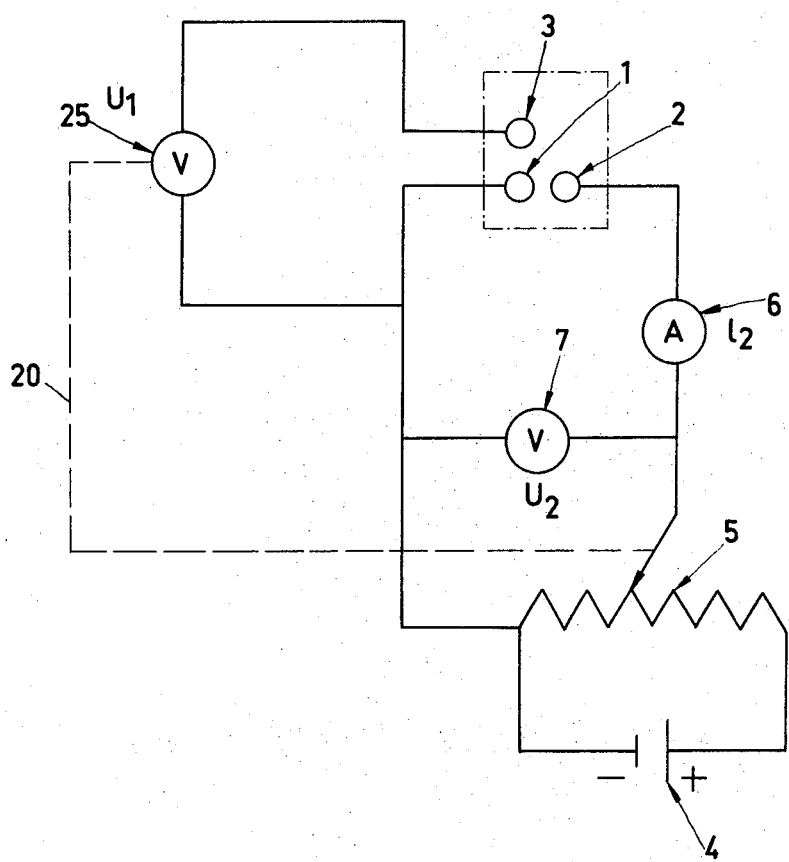

The object of this invention is to accomplish a combined measuring, as well as dosage control and regulation method, for water soluble, oxidizing or reducing compound, particularly in cases where the variations in concentration are rapid and the concentration of the compound is measured continuously by an electrode combination comprising a measuring electrode, a comparison electrode, and a counter electrode, and where the potential or voltage difference between the measuring electrode and the comparison electrode is kept at desired level, and constant, at which the current (ma.) maintaining the constant potential deriving from the outside power supply is proportional to the content of compound.

The method according to the invention is particularly applicable in such cases where the concentration changes due to reactions and/or dilution occur rapidly, as for instance in pulp bleaching and corresponding dynamic processes.

In such dynamic processes the dosage control and regulation strived at is carried out by continuous measurement of the content of the compound to be measured based on redox potential measurement. But this measuring method is not sufficiently selective for the compound to be measured. This holds true for e.g. chlorine, a frequently used oxidizer in industry, at which the redox potential measurement is disturbed by chlorine ions. On this account the method cannot be used, e.g. in pulp bleaching, for the control and regulation of the chlorine dosage during the chlorination stage, as sea water is used in the process. Another drawback is that the relation between the content of compound and the redox potential is not linear, and also that the exactness of the method is not always satisfactory. The non-applicability of the method is apparent by the fact that it has not been successful e.g. in solving the problem of pulp bleaching, in spite of the fact that the chemicals used for bleaching are typical powerful oxidizers (chlorine and its derivatives) or reducers ($SO_2$ and hydrosulphite).

For continuous determination of the content of oxidizer there are known methods based on the use of ammeters, which have found application in determining the content of dissolved oxygen in water. In these methods two electrodes are sunk into water, at which the nobler electrode polarizes due to oxygen dissolved in the water and a current is created in the exterior circuit, which is proportional with the oxygen content of the water. The drawback with this method is that the less noble electrode becomes inactivated in the course of time, which affects the function of the nobler electrode, so as to cause an error in the results. The method is also greatly dependent of the chosen electrode material.

The above methods based on the use of ammeters are applied in determining oxygen dissolved in water. By these methods the oxygen contents in natural waters and in feed waters of steam power plants are determined. In these cases the variations in oxygen content are slow and dependent of the partial pressure of the oxygen gas in contact with the water, the oxygen content generally being low. In these "static" cases with relatively slowly changing concentrations the known methods based on the use of ammeters are giving practicable results. The situation is quite different if the variations in the contents of the compounds to be measured are rapid, and if these compounds are powerful oxidizers or reducers. Correlation between the measuring results is then non-existent or poor. The result is natural and obvious. In examining the reaction of an oxidizer, such as chlorine, with the measuring electrode the basic formula is:

$$Cl_2 + 2e^- \rightleftharpoons 2Cl^-$$

With other words, chlorine is reduced on the measuring electrode serving as cathode. In order to take the electrons required by the reaction from the electrode, the chlorine must be able to penetrate through the surface layer of the electrode as far as the electron containing metal surface. Quite freely the chlorine molecule is able to penetrate through the surface by diffusion only. On account of this diffusion the output current of the measurement is controlled by the diffusion taking place on the surface of the electrode. The current is expressed by the following equation $$i_d = kn \cdot D \cdot C$$

where $i_d$=current density, $n$=number of electrons, $D$=diffusion coefficient, $C$=molar concentration of the reducing compound, and $k$=a constant containing faraday number, electrode surface, and diffusion layer thickness. Thus measuring accuracy is powerfully dependent of the thickness of the diffusion layer, and of the rate of diffusion in this layer. In cases of slow variations the effect of diffusion is not apparent.

The purpose of this invention is to eliminate the above drawbacks, which is accomplished by the control and regulation method according to the invention, the main characteristic feature of which is that the reaction mixture, solution, or suspension, is brought to flow passed electrodes with a speed of 0.5 m./sec., or more, that the distance of the comparison electrode from the measuring electrode is $\leq 10$ mm., at which the measuring electrode is cathodicly protected from corrosion, and that the current values (ma.), or voltage values (ma.), obtained in measuring are used for the control and regulation of the measured compound.

The method according to the invention also offers good and reliable measuring accuracy in cases of dynamic, rapid concentration changes, as well as under conditions of high corrosion effect by the oxidizer and reducer being measured. The content of dissolved oxidizer, such as chlorine, in water can be determined over again also at long intervals of time, and the method is not dependent of the choice of electrode.

The method according to the invention is of marked economic importance when applied for instance in connection with the bleaching of pulp.

A few applications of the invention are presented below as follows, with reference to the enclosed drawings.

Figure 2:
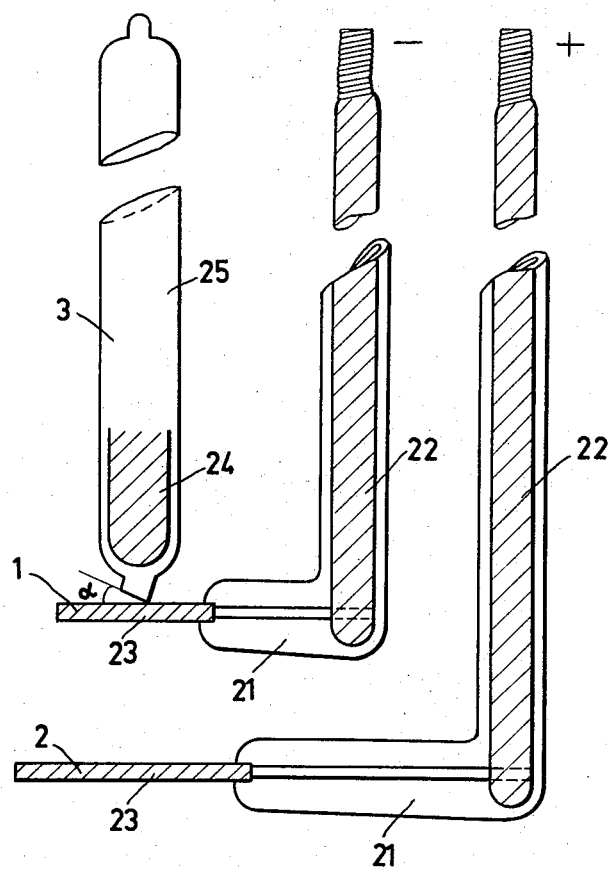
Figure 3:
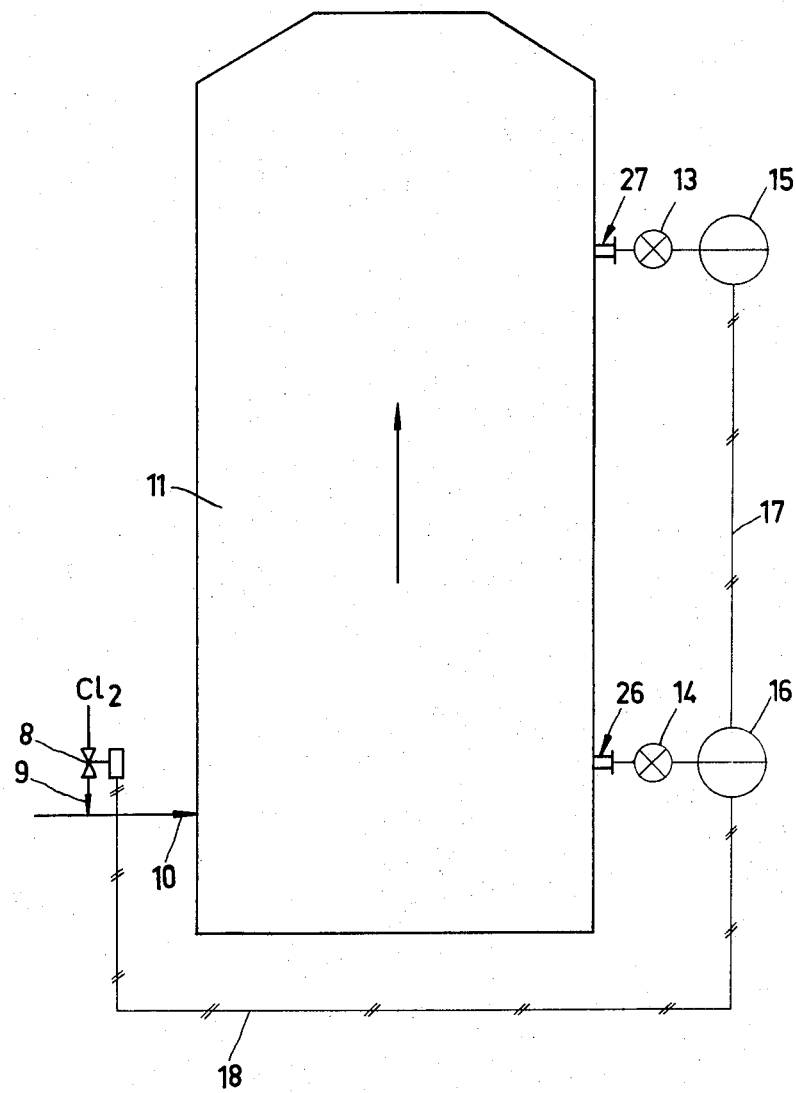
Figure 4:
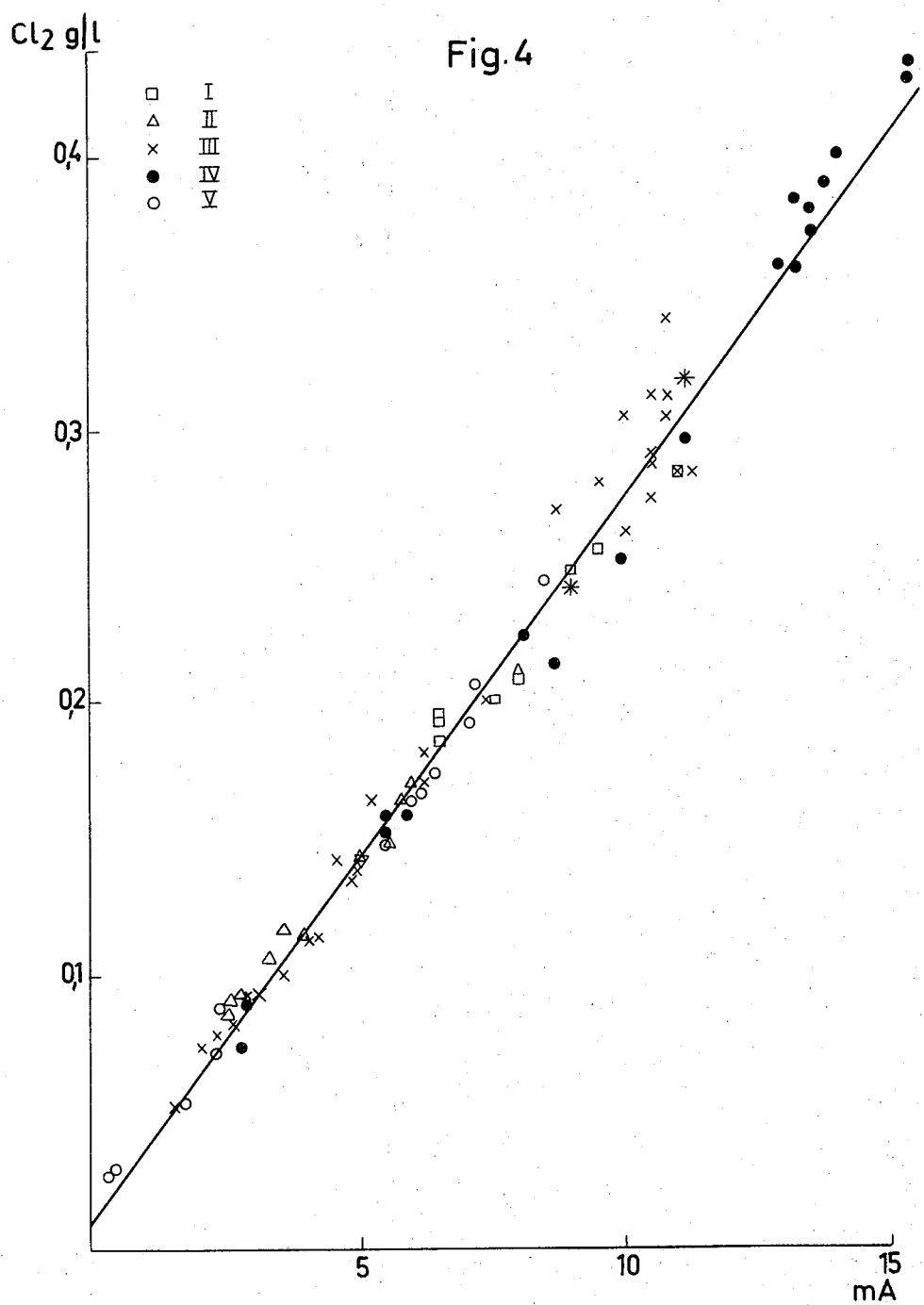
Figure 5:
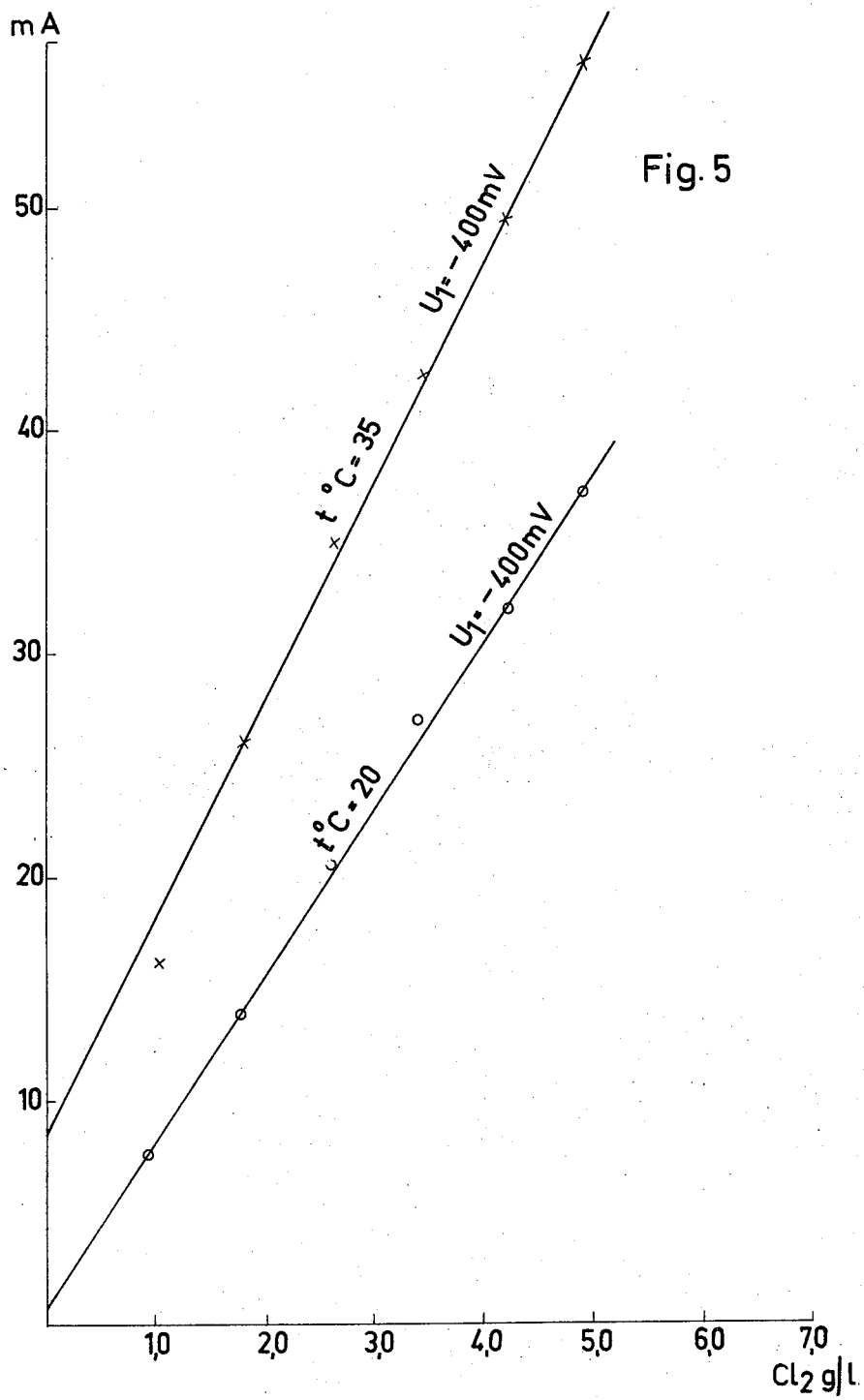

FIG. 1 presents a diagram of connections according to the invention,

FIG. 2 an electrode combination according to the invention used in measuring,

FIG. 3 automatic dosing of chlorine in pulp chloration, according to the invention, FIG. 4 measuring results from pulp suspension in chloration tower, FIG. 5 measuring results from aqueous solution of NaOCl, FIG. 6 measuring results from aqueous solution of $SO_2$, and FIG. 7 measuring results from aqueous solution of chlorine.

Setting the comparison electrode immediately at the surface of the measuring electrode, the circuit diagram according to the enclosed FIG. 1 accomplishes the best possible cathodic corrosion protection for the measuring electrode. At growing concentration of the compound causing corrosion-dissolving of the measuring electrode—on the surface of the measuring electrode, the potential between the measuring electrode and the comparison electrode measuring its surface layer tends to change due to the effect of the concentration change. Because the change in potential is compensated by means of a rheostat, or potentiometer, taking additional current from the power source, the electron reserve of the electrode grows large enough to suffice for the electrode reaction, and thus the electrode metal will not surrender electrons, which consequent dissolving and corrosion of the electrode. Corrosion of the measuring electrode would cause its surface to change with consequent change in current density and incorrect measuring result. Experiments have shown that the measuring accuracy, due to the electrical corrosion protection, remains good also on measuring such strongly corrosive compounds as chlorine and chlorine dioxide in chloride containing water solution.

In this method the output current or voltage obtained in measuring is directly proportional with the content of the measured compound. By choice of constant potential the straight line representing correlation between current and compound concentration can be brought through origo and is then expressed by the equation $y = kx$.

The simple correlation between the quantity to be measured and the measuring quantity makes it possible to use in the dosage control of the compound the milliampere meter reading directly using a coefficient. Correspondingly the milliampére meter or recorder can be calibrated to show the concentration values directly. In using the measuring results for automatic dosage regulation the best results are obtained by using the two-point regulation system in processes with rapid concentration changes. The enclosed FIG. 3 presents a diagram of a dosage regulation system working on the two-point regulation principle. According to FIG. 3 gaseous chlorine is conducted in the direction of the arrow 9, through the valve 8 into the pulp suspension moving in the direction of the arrow 10. Then the partly chlorinated pulp suspension together with unreacted chlorine dissolved in the water enter the chloration tower 11, where the reaction mixture formed by these together with pulp suspension flows from below upwards, during which the content of unreacted chlorine continually decreases towards the top. The chlorine content is identified with the aid of a measuring testing organ 26, and the message by means of a transmitter 14 goes to an indicating regulator 16 which by means of a control cable 18 adjusts the feed valve 8 for chlorine in such a way, that the chlorine content identified by the measuring testing organ 26 retains its setting value. The measuring testing organ 27 identifies the residual chlorine content at the top of the tower. The message obtained from the measuring organ 27 goes to the transmitter 13, and from here to the recording regulator 15 which checks that the chlorine content at the organ 27 does not pass the set limits. If the limits are passed the regulator 15 by means of the control cable 17 adjusts the setting value of the regulator 16 to a point where the chlorine content at the measuring organ 27 returns to the set limits. The measurements are made on two measuring points 1 and 2, in which the content of the compound to be measured is different due to reaction and/or dilution. The measuring quantity of the first measuring point is given a setting value. If the measuring values deviate from the setting value, the regulation system regulates the dosing valve according to a pre-planned programme in such a way, that the measuring values return to conformity with the setting value. The measuring quantity of the second latter measuring point of the process is given limit values. If the measuring values surpass the given limit values, the regulation system corrects the setting value of the measuring point 1, so that the measuring values of the measuring point 2 return to the set limits.

The enclosed FIG. 1 presents the current diagram of the device to be used in the concentration measurements of the method according to the invention. The measuring electrode, cathode 1, may consist of metal, metal alloy, or carbon. The counter electrode, anode 2, may consist of the same materials as the measuring electrode 1. In measuring the electrodes 1 and 2 may be of the same or different material. As comparison electrode 3 one may use known comparison electrodes, such as calomel electrode. The current is obtained from the power supply 4. By means of the rheostat 5, or a potentiometer replacing it, such a current is conducted to the counter electrode 2 that the potential or voltage difference between the measuring electrode 1 and the comparison electrode 3 is of desired size, and constant. The readings of the current meter 6 and the volt meter 7 are proportional to the content of the compound to be measured. The measured current values $I_2$ and volt values $U_2$ can be used as such, or amplified, for the dosage control or regulation. In FIG. 1 the current meter is designated by the letter A, and the volt meters by the letter V. The letter $I_2$ represents the reading of the current meter, and the letters $U_1$ and $U_2$ that of the adjacent volt meters. In FIG. 1 the broken line 20 indicates mechanical connection (e.g. a human being) between the volt meter 25 and the rheostat 5. The connection is preferably accomplished with the aid of modern electronics, for instance a potentiometer.

Because the location of the comparison electrode 3 in respect of the measuring electrode 1 is of decisive importance for the measuring accuracy and the corrosion protection of the measuring electrode, an electrode combination used in the measurements is presented in the enclosed FIG. 2 which shows the location of the different electrodes with respect to one another. The body 22 of the electrodes 1 and 2 consists of conductive material such as metal surfaced by insulating material 21, so that only the actual electrode (the electrode plate) 23 remains bare, which actual electrodes 23 are conductively connected with the bodies 22. As in FIG. 2 the comparison electrode 3 may be of the type generally used in laboratories and in industry, having the metal parts of the calomel or mercuric chloride electrode sunk into saturated KCl solution inside of a glass vessel 25. The comparison electrode must be in liquid contact with the solution being measured. The electrodes are designated as follows: measuring electrode 1, counter electrode 2, and comparison electrode 3. As the figure reveals, the glass surface of the measuring end of the calomel electrode used as comparison electrode is ground oblique, while the angle $\alpha$ determines the distance of the point of the fibre capillary from the surface of the measuring electrode. The lower end of the comparison electrode rests against the surface of the measuring electrode so that the distance remains unchanged.

The results of trial runs with the method according to the invention are presented below with reference to the enclosed figures. The measurements were carried out with platinum electrodes using calomel electrode as comparison electrode. In the experiments a flow velocity of 1 m./s. was used. The distance of the comparison electrode from the surface of the measuring electrode was 0.2 mm.

EXAMPLE 1

FIG. 4 presents the results according to the invention, from chlorine content measurements on pulp chlorated in a continuously operating chloration tower. The current measurements were made directly on pulp suspension, and the chlorine content was determined by titration of solution sample isolated from suspension. In the diagrams of FIG. 4 the vertical axis presents residual chlorine in grams per litre, and the horizontal axis current used in milliampere. In chloration sea water was used as suspension means, the chloration thickness being 3%, and $p_H < 2$. A suspension sample was taken from the chloration tower 5 minutes after chlorine addition and was pumped through the electrode chamber. The voltage difference between the measuring electrode and the comparison electrode was maintained at 600 mv. with the aid of potentiometer. The coefficient of correlation between the current and the chlorine content computed from the results was 0.993. The measurements were carried out without interruption during a period of 5 days. The measuring results obtained during the first 24 hour period are marked by the symbol □, during the second 24 hours by the symbol Δ, during the third by X, the forth by ●, and the fifth by o.

EXAMPLE 2

FIG. 5 presents the correlation between the current and the chlorine content of the hypochlorite-water solution measured by the method according to the invention. In the diagram of FIG. 5 the vertical axis gives the current in milliampere, and the horizontal axis the chlorine content in grams per litre. The measurements were made at the temperatures 20 and 35° C. in both cases of which the constant voltage $U_1$ was —400 millivolt.

EXAMPLE 3

FIG. 6 presents the correlation between the current and the sulphur dioxide content of the sulphur dioxide-water solution measured by the method according to the invention. The vertical axis gives the current in milliampere, and the horisontal axis the sulphur dioxide content in grams per litre. $p_H$ of the sulphur dioxide solution was 2–3. The constant voltage $U_1$ was —1100 millivolt.

EXAMPLE 4

FIG. 7 represents the correlation between the current and the chlorine content of the chlorine-water solution measured by the method according to the invention. The vertical axis now gives the voltage $U_2$ in millivolt, and the horisontal axis the chlorine content in grams per litre. The constant voltage $U_1$ was —350 millivolt. $p_H$ of the chlorine solution was 1.5.

I claim:

1. A method for continuously measuring and regulating the introduction of a reactant into a reaction medium comprising the steps of:

immersing a first electrode, a second electrode and a third electrode in said medium, placing said third electrode at a distance not more than 10 mm. from said second electrode to cathodically protect said second electrode from corrosion, flowing the medium past said electrodes at a rate of at least 0.5 m./sec., supplying a current to said medium from said first electrode in a value sufficient to maintain a constant potential difference between said second and third electrodes, measuring the current supplied from said first electrode, and regulating the introduction of the reactant into the reaction medium in a selected ratio dependent upon said current measurement.

2. The method according to claim 1 wherein the method is carried out twice, once at each of the two distinct measuring points, the first measuring point being at a point downstream in the flowing medium from the second measuring point, comprising: regulating said reactant at the first measuring point, establishing an allowable range of current measurements at the second measuring point, and changing the regulation at the first measuring point wherever the current measurement at the second measuring point goes outside the allowable range to bring the current measurement at the second point back into the allowable range.

3. The method according to claim 1 wherein the reactant is chlorine and the method includes introducing chlorine in a chlorination medium.

4. The method according to claim 1 wherein the reactant is hypochlorinate and the method includes introducing hypochlorite in hypochlorite bleaching.

5. The method according to claim 1 wherein the reactant is chlorine dioxide and the method includes introducing chlorine dioxide in chlorine dioxide bleaching.

6. The method according to claim 1 wherein the reactant in peroxide and the method includes introducing peroxide in peroxide bleaching.

7. The method according to claim 1 mherein the reactant is hydrosulfite and the method includes introducing hydrosulfite in hydrosulfite bleaching.

References Cited

UNITED STATES PATENTS

| | | | |
|---|---|---|---|
| 3,051,631 | 8/1962 | Harbin, Jr. et al. | 162—238 UX |
| 3,471,391 | 10/1969 | Peters et al. | 204—195 R |
| 3,477,931 | 11/1969 | Ueda et al. | 204—147 |
| 3,486,971 | 12/1969 | Weyrick | 162—49 X |

S. LEON BASHORE, Primary Examiner

A. D'ANDREA, JR., Assistant Examiner

U.S. Cl. X.R.

162—74, 78, 83; 204—195 R, 195 C